(12) United States Patent
Boukari et al.

(10) Patent No.: US 9,790,114 B2
(45) Date of Patent: Oct. 17, 2017

(54) METHOD AND DEVICES FOR REMINERALIZATION OR FOR CORRECTING THE PH OF WATER PRODUCED IN AN AIRCRAFT

(71) Applicants: Morou Boukari, Bessieres (FR); Marc Auriol, Bessieres (FR)

(72) Inventors: Morou Boukari, Bessieres (FR); Marc Auriol, Bessieres (FR)

(73) Assignee: PRODOSE, Bessieres (FR)

( * ) Notice: Subject to any disclaimer, the term of this patent is extended or adjusted under 35 U.S.C. 154(b) by 104 days.

(21) Appl. No.: 14/360,315

(22) PCT Filed: Nov. 23, 2012

(86) PCT No.: PCT/FR2012/052711
§ 371 (c)(1),
(2) Date: Jul. 21, 2014

(87) PCT Pub. No.: WO2013/076432
PCT Pub. Date: May 30, 2013

(65) Prior Publication Data
US 2015/0284277 A1    Oct. 8, 2015

(30) Foreign Application Priority Data
Nov. 25, 2011    (FR) ...................... 11 60828

(51) Int. Cl.
*C02F 9/00*    (2006.01)
*C02F 1/00*    (2006.01)
(Continued)

(52) U.S. Cl.
CPC ................ *C02F 9/00* (2013.01); *C02F 1/008* (2013.01); *C02F 1/66* (2013.01); *H01M 8/06* (2013.01);
(Continued)

(58) Field of Classification Search
CPC ............... C02F 1/006; C02F 1/66; C02F 1/68
See application file for complete search history.

(56) References Cited

U.S. PATENT DOCUMENTS 6,093,321 A * 7/2000 Bonnelye ................... C02F 3/30
210/610
7,713,426 B2 * 5/2010 Newcombe ............. C02F 3/223
210/650

(Continued)

FOREIGN PATENT DOCUMENTS

DE    10 2011 102177 A1    11/2012
JP    2006 228619 A    8/2006
WO    WO 2012/159890 A1    11/2012

OTHER PUBLICATIONS

International Search Report, dated Jan. 23, 2013, from International Phase of the instant application.
(Continued)

Primary Examiner — Krishnan S Menon
Assistant Examiner — Ryan B Huang
(74) Attorney, Agent, or Firm — Paul & Paul

(57) ABSTRACT

The invention relates to a method of remi-neralization and correction of pH for water produced by a fuel cell (P) on board an aircraft, noteworthy in that it consists in diverting part of the water (E1) produced by the cell to at least one treatment tank (200) containing a saturation reagent and in mixing the flow of treated water (E2) issuing from the treatment tank (200) with the undiverted flow of water (E3) so as to obtain water (E5) with the desired mineralization and/or pH. The invention also relates to devices making it possible to implement said method.

19 Claims, 4 Drawing Sheets

(51) Int. Cl.
*C02F 1/66* (2006.01)
*H01M 8/06* (2016.01)
*C02F 1/68* (2006.01)
*H01M 8/04119* (2016.01)
*C02F 1/28* (2006.01)
*C02F 1/32* (2006.01)
*C02F 1/78* (2006.01)
*C02F 1/42* (2006.01)

(52) U.S. Cl.
CPC .............. *C02F 1/283* (2013.01); *C02F 1/32* (2013.01); *C02F 1/325* (2013.01); *C02F 1/42* (2013.01); *C02F 1/68* (2013.01); *C02F 1/78* (2013.01); *C02F 2201/001* (2013.01); *C02F 2201/002* (2013.01); *C02F 2209/03* (2013.01); *C02F 2209/055* (2013.01); *C02F 2209/40* (2013.01); *C02F 2303/04* (2013.01); *H01M 8/04156* (2013.01); *H01M 2250/20* (2013.01); *Y02T 90/32* (2013.01)

(56) References Cited

U.S. PATENT DOCUMENTS

| 7,771,599 | B1 | 8/2010 | Choi | |
| 2002/0179545 | A1* | 12/2002 | Rosenberger | B01D 61/142 210/806 |
| 2004/0038089 | A1* | 2/2004 | Hoffjann | B64D 11/02 60/645 |
| 2004/0043276 | A1 | 3/2004 | Hoffjann | |
| 2004/0104180 | A1* | 6/2004 | Gaudinot | A23L 2/54 210/749 |

OTHER PUBLICATIONS

English Translation of International Preliminary Report on Patentability Chapter I, dated Jul. 8, 2014, from International Phase of the instant application.

* cited by examiner

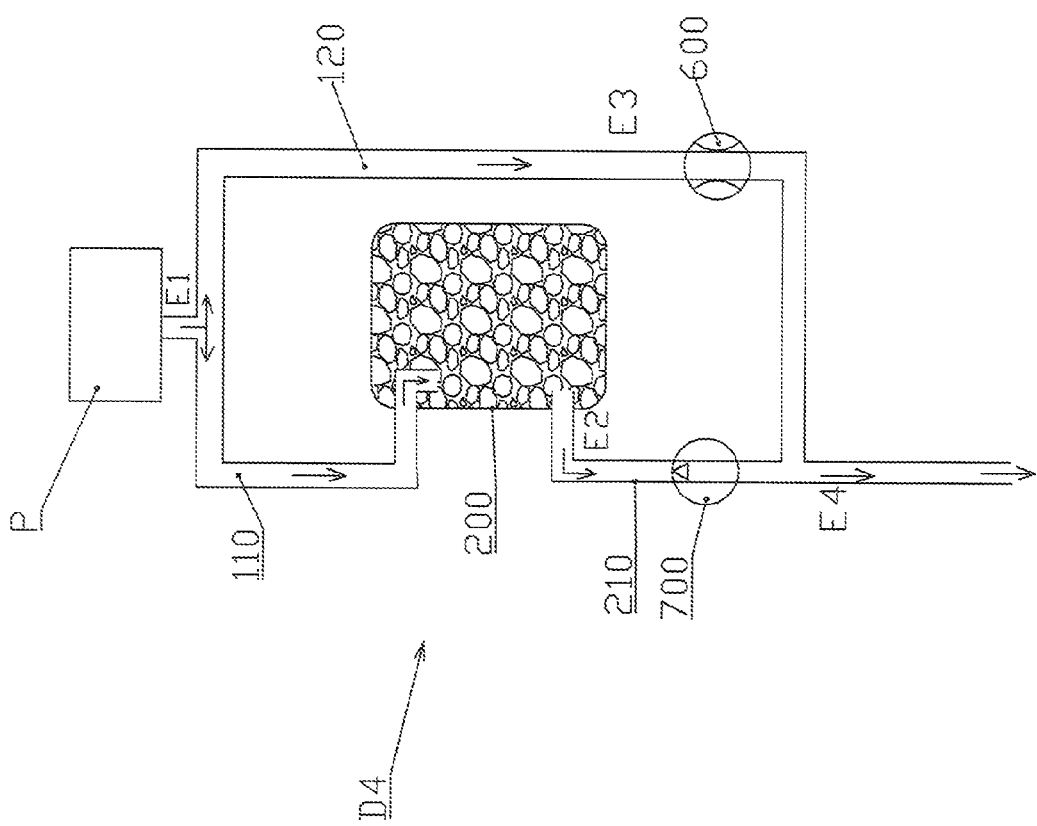

METHOD AND DEVICES FOR REMINERALIZATION OR FOR CORRECTING THE PH OF WATER PRODUCED IN AN AIRCRAFT

FIELD OF APPLICATION OF THE INVENTION

This invention relates to the field of equipment on board a passenger aircraft and in particular to adaptations making it possible, under the best conditions, to remineralize and correct the pH of water produced in an aircraft.

DESCRIPTION OF THE PRIOR ART

In order to reduce kerosene consumption, noise intensity and carbon dioxide production, aircraft manufacturers are turning toward the implementation of electrical power for the ground movement of aircrafts.

A technological solution for such an implementation lies in the use of a fuel cell to power the electric engine(s).

In parallel with the production of electricity, the chemical reaction implemented by a fuel cell produces water and heat.

To reduce the volume of water to be carried by a passenger aircraft, it may be envisaged to use the water produced by the fuel cell as potable water for consumption and for the supply of sanitary installations.

Such a use is nevertheless beset by numerous technical problems as described below.

The water produced by a fuel cell is demineralized and acidic and therefore requires an operation of demineralization and correction of its pH before being injected into the supply network of the aircraft.

In addition to the aspect of passenger health protection, this operation is also necessary due to the fragility of the generally stainless steel conduits of said supply network.

However, even if solutions for remineralization and pH correction exist, they require an exposure time and/or an exposure surface between the product for remineralization and/or pH correction and the water, which are not consistent with the exposure time, the congestion and/or the available mass in an aircraft.

These various technical problems have, until now, prevented serious consideration of the use of water production by a fuel cell as water for consumption and for supplying sanitary installations in a passenger aircraft in spite of the aforementioned advantages.

DESCRIPTION OF THE INVENTION

In view of the above, the applicant has conducted research aimed at overcoming the aforementioned disadvantages.

This research has led to the design of a method for remineralization and pH correction of water produced by a fuel cell on board an aircraft, which is notable in that it comprises diverting a portion of the water produced by the fuel cell toward at least one treatment tank containing a saturation reagent, and mixing the treated water flow coming from the treatment tank with the non-diverted water flow so as to obtain water with the desired mineralization and/or pH.

This feature is particularly advantageous in that it eliminates the need to treat all of the water from the fuel cell by direct contact with the reagent. The use of a reagent reaching a level of saturation makes it possible to control the parameters for treatment of the water coming from the treatment tank.

The treatment tank can contain a single treatment reagent and be associated with other tanks or contain a plurality of reagents intended for multiple treatments. It is then no longer necessary to have an exposure time with a reagent or to measure a reagent with respect to a volume, since the method of the invention can ensure that a certain volume of water passes into a treatment tank the treatment level of which is controlled, ensuring that, after mixing, the desired mineralization and/or pH levels are obtained. Moreover, the remineralization and/or pH correction are activated upon circulation of the water in the treatment tank, without requiring a significant exposure time.

It is understood that the implementation of such a method will lead to particularly compact solutions satisfying the objectives of the invention. The method of the invention therefore makes it possible to envisage using water from a fuel cell on board an aircraft for the purposes of passenger consumption and supply of the sanitary installations of said aircraft.

Thus another objective of the invention lies in the device making it possible to implement the method described above. According to the invention, the device comprises a first distributor tank in which the demineralized water from the fuel cell arrives, and from which at least two conduits emerge:

a first conduit leads into a second treatment tank containing a saturation reagent with which the water comes into contact for the purposes of remineralization and/or pH correction, the water thus treated being discharged to a third conduit, a second conduit allows water coming directly from the first tank to circulate, and is rejoined by the treated water coming from the second tank for the purposes of mixing.

The use of a distributor tank ensures that the water from the fuel cell is diverted.

In order to double the capacities of such a device, said device comprises, according to another particularly advantageous feature of the invention, a first distributor tank in which the demineralized water from the fuel cell arrives and from which three conduits emerge:

two conduits each lead into a different treatment tank comprising a saturation reagent with which the water comes into contact, the water thus treated being discharged to a fourth conduit and a fifth conduit, a third conduit coming from the distributor tank allows water coming directly from the first tank to circulate and is rejoined by the treated water coming from the two treatment tanks inside a mixing tank for the purposes of mixing.

This doubling of the treatment capacities makes it possible to envisage specialization thereof. Thus, according to another particularly advantageous feature of the invention, a first treatment tank comprises a saturation reagent ensuring remineralization and the second treatment tank comprises a saturation reagent ensuring correction of the pH.

A simplified version of the device comprises a division of the conduit for discharge of the demineralized water coming from the fuel cell into two conduits, one of which leads into a treatment tank, and the treated water conduit leaving said tank joins the non-treated water conduit for the purposes of mixing. To ensure the treatment based on all of the parameters, such a device can be cascade-mounted upstream or downstream of an identical device for treatment based on another parameter.

The implementation of the method, regardless of the device, is facilitated by the fact that one or more conduits is or are equipped with a flow rate regulation module. Thus, according to the type of treatment or the volumes displaced, the flow rates are adjusted.

For example, in order to filter the water from the fuel cell but also the water from the treatment, one or more conduits is or are equipped with a filtration module. These filtration modules can be arranged at the ends of the conduits inside said tanks.

Of course, the choice of reagent is crucial. To implement this method, the reagent very quickly reaches saturation so as to ensure the regularity of the parameters for treatment of the water from the treatment tanks from the start of operation. In addition, it is designed so that it can act only when the water is moving and not when it is stagnant, thus preventing overconcentration.

According to a non-limiting embodiment, the saturation reagent for the remineralization and/or pH correction contains the following elements, associated or not:
  calcium carbonate,
  calcium hydroxide,
  bicarbonates,
  carbonates,
  sulfuric acid,
  ion exchange resin,
  mineral absorbents,
  sodium chloride,
  calcium chloride.

According to another particularly advantageous feature, the device comprises means for measuring the mineralization and the pH at the outlet of the device, communicating the data to an automated device for controlling the flow rate regulation module(s), thereby making it possible to propose the most precise remineralization and pH correction possible, and automatically.

According to another particularly advantageous feature of the invention, the device comprises at least one flowmeter making it possible to measure the flow rate of the water before or after mixing and at least one metering pump positioned at the outlet of the treatment tank so as to measure the amount of treated water to be mixed with the non-treated water.

According to a preferred embodiment, the device comprises means for measuring the flow rate (or a flowmeter) of the non-diverted water associated with metering means of the metering pump type arranged at the outlet of the treatment tank so as to reinject the adequate treated water volume into the non-treated water.

The device also comprises a module for disinfecting the water after the final mixing.

According to a particularly advantageous feature of the invention, the treatment tanks are detachable and interchangeable. Whether or not it is a specialized configuration, the design of the treatment tanks as expendable with a limited lifetime ensures control of the method and the effects thereof.

As the fundamental concepts of the invention have been described above in their most basic form, other details and features will become clearer in view of the following description and the appended drawings, with a plurality of embodiments of a device according to the invention provided as non-limiting examples.

BRIEF DESCRIPTION OF THE DRAWINGS

FIG. 4 is a schematic drawing of a cross-section of a fourth embodiment of a device according to the invention.

DESCRIPTION OF PREFERRED EMBODIMENTS

Figure 1:
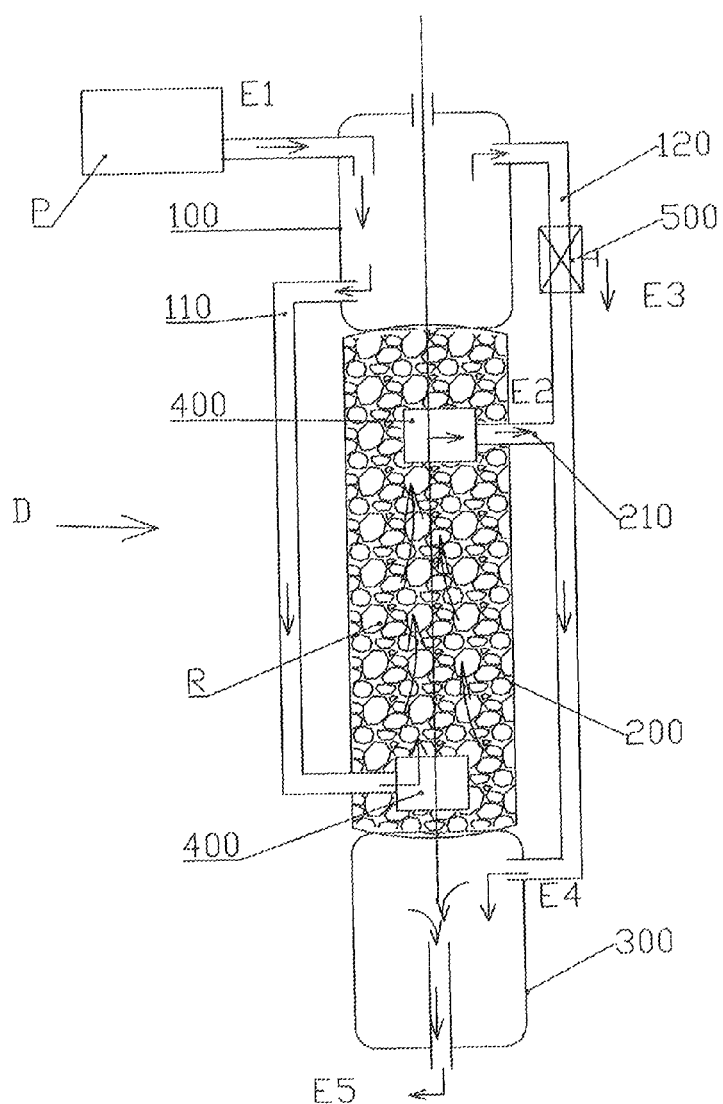
FIG. 1 is a schematic drawing of a cross-section of a first embodiment of a device according to the invention.

As shown in the drawing of FIG. 1, the device referenced D as a whole is an on-board device that ensures the remineralization and pH correction of water, referenced E1, by a fuel cell (not shown) on board an aircraft (not shown). This device D comprises a series of three cylindrical tanks 100, 200, 300 of different volumes, arranged coaxially and contiguously one after another so as to form a compact assembly having the same external diameter.

A first distributor tank 100 receives the demineralized water E1 from the fuel cell referenced P and from which two conduits 110 and 120 emerge:
  a first conduit 110 leads into a second treatment tank 200 comprising a rapid saturation reagent R with which the water comes into contact for the purposes of remineralization and/or pH correction, the water thus treated, referenced E2, being discharged to a third conduit 210,
  a second conduit 120 allows water E3 coming directly from the first tank 100 to circulate and is rejoined by the treated water E2 coming from the second tank for the purposes of mixing by intersection of conduits 120 and 210.

The third tank receives and optimizes the water mixture E4. Mineralized water with a corrected pH E5 leaves the tank 300.

As shown, a plurality of filtration modules 400 are arranged along the path of the treated or non-treated water. According to an embodiment not shown, filtration means are provided in the distributor tank so that the water received is filtered before distribution in conduits 110 and 120.

Similarly, a flow rate regulation module 500 is provided in the conduit 120. The difference in height between the outlets giving access to the conduits 110 and 120 ensures the circulation of water in the bypass circuit in spite of the head losses due to the presence of the reactant R in the tank 200.

According to another embodiment not shown, the first tank 100 also comprises a volume of reagent to perform a first treatment step.

The same applies to the final tank, which can be equipped with a filtration module and/or a reagent volume to complete the treatment.

Figure 2:
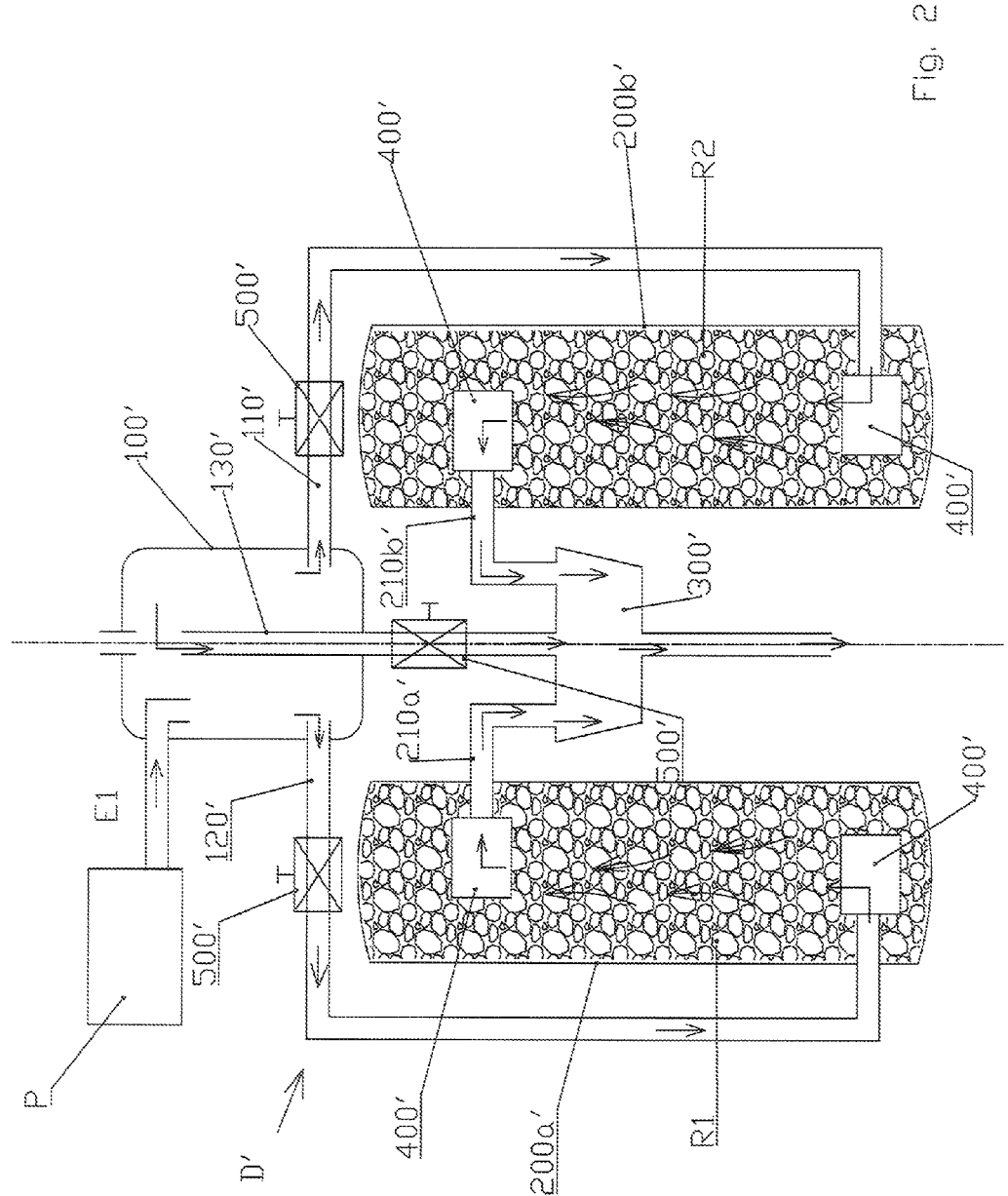
FIG. 2 is a schematic drawing of a cross-section of a second embodiment of a device according to the invention.

The device D' shown in the drawing of FIG. 2 implements the same method but by means of two treatment tanks 200a' and 200b'.

As for device D, device D' comprises a first distributor tank 100' in which the demineralized water E1 from the fuel cell, referenced P, arrives, and from which three conduits emerge.

Two conduits 110' and 120' each lead into a different treatment tank 200a' and 200b' comprising a rapid saturation reagent R1 and R2, which can be different from one tank to another with which the water comes into contact, the water thus treated being discharged by a fourth conduit 210a' and a fifth 210b' conduit.

The third conduit 130' allows water coming directly from the first tank 100' to circulate and is rejoined by the treated water coming from the two treatment tanks inside a mixing tank 300' for the purposes of mixing.

As shown, a plurality of filtration modules 400' are provided in the device D', in particular at the inlets and outlets of the treatment tanks.

In addition, the conduits 110', 120', 130' are equipped with a filtration module 500'.

Figure 3:
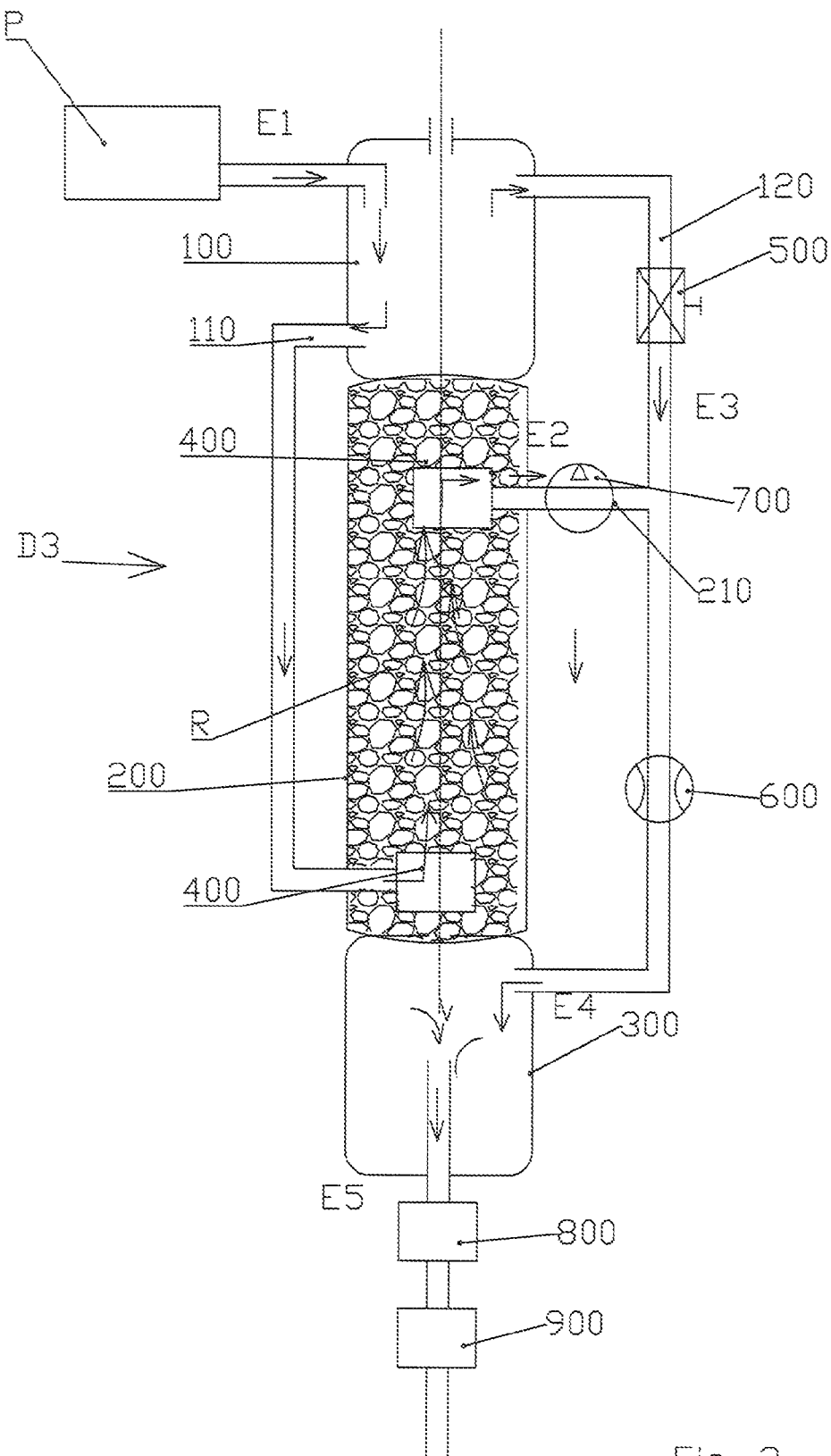
FIG. 3 is a schematic drawing of a cross-section of a third embodiment of a device according to the invention.

The device D3 shown in the drawing of FIG. 3 has the features of device D of FIG. 1, to which a plurality of functionalities have been added. Thus, as shown, a flowmeter 600 is provided in the conduit 120 in this case downstream of the intersection with the discharge conduit 210 of the treatment tank. This conduit 210 is equipped upstream of its intersection with the conduit 120 with a metering pump 700 of which the metering is controlled on the basis of the measured flow rate.

In addition, this device D3 also comprises, downstream of the outlet of the tank 300, a water disinfection module 800 as well as a new filtration module 900.

According to a preferred embodiment, the disinfection module 800 comprises ultraviolet radiation production means as well as ozone production means.

In addition, according to another feature, the filtration of the final filtration means 900 is performed by means of activated carbon.

According to another feature not shown, the tank 300 comprises a plurality of mixing tanks communicating with one another so as to better manage the available space.

The device D4 shown in the drawing of FIG. 4 has a simplified configuration in which the conduit for discharge of the water E1 from the fuel cell P is immediately divided into two conduits 114 and 124, one of which leads into a treatment tank 200. The conduit 210 for treated water E2 leaving said tank 200 rejoins the conduit 124 for the non-treated water E3 for the purposes of mixing in accordance with the invention in order to be mixed and form water with the desired pH and/or mineralization E4. As shown for device D3, the conduit 124 for the non-treated water E3 is equipped with a flowmeter 600 that controls the metering of the metering pump 700 provided in the conduit 210 for discharge of the treated water E2. Such a simplified configuration can be broken down according to the number of parameters to be treated. For example, the treated water to be remineralized in the installation shown can go to the inlet of an identical installation of which the treatment tank ensures the pH correction, and so on.

It is understood that the method and the devices described above and illustrated have been done so for the purpose of disclosure rather than limitation. Of course, various arrangements, modifications and improvements may be made to the example above without going beyond the scope of the invention.

The invention claimed is:

1. A device for remineralization and pH correction of water produced by a fuel cell in a confined space, the device comprising:
    a saturation reagent;
    a first tank;
    a first treatment tank containing the saturation reagent;
    a second tank;
    the tanks arranged top to bottom in the order of the first tank, the first treatment tank, and the second tank;
    means for providing a flow of treated water from the first treatment tank;
    a first conduit leading from the bottom portion of the first tank into a bottom portion of the first treatment tank;
    a second conduit leading from the top portion of the first tank to a top portion of the second tank;
    a third conduit leading from the top portion of the first treatment tank, through which treated water is discharged, rejoining the second conduit whereby mixing occurs at the intersection of second conduit and third conduit; and
    a control valve in conduit upstream of conduit so as to obtain water with the desired mineralization or pH.

2. A device according to claim 1, characterized in that the device further comprises a first distributor tank in which the demineralized water from the fuel cell arrives, and from which at least two conduits emerge:
    a first conduit leads into the first treatment tank containing a saturation reagent with which the water comes into contact for the purposes of remineralization or pH correction, the water thus treated being discharged to a third conduit,
    a second conduit allows water coming directly from the first treatment tank to circulate, and is rejoined by the treated water coming from a second treatment tank for the purposes of mixing.

3. A device according to claim 1, characterized in that the device further comprises a first distributor tank in which the demineralized water from the fuel cell arrives and from which three conduits emerge:
    a first conduit leads to the first treatment tank and a second conduit leads to a second treatment tank, the first treatment tank and the second treatment tank each comprising a saturation reagent with which the water comes into contact, the water thus treated being discharged to a fourth conduit from the first treatment tank and a fifth conduit from the second treatment tank, the fourth conduit connecting the first treatment tank to a mixing tank, the fifth conduit connecting the second treatment tank to the mixing tank,
    a third conduit connecting the distributor tank to the mixing tank, the third conduit allowing water coming directly from the first distributor tank to circulate and the water provided by the third conduit being rejoined by the treated water coming from the first and the second treatment tanks inside the mixing tank for the purposes of mixing.

4. A device according to claim 1 to be implemented, characterized in that it comprises a division of the conduit for discharge of the demineralized water coming from the fuel cell into two conduits, one of which leads into a treatment tank, and the treated water conduit leaving said tank joins the non-treated water conduit for the purposes of mixing.

5. A device according to claim 3, characterized in that one of the first and second treatment tanks comprises a saturation reagent ensuring remineralization and the other of the first and the second treatment tanks comprises a saturation reagent ensuring the pH correction.

6. A device according to claim 2, characterized in that any of the first, second, or third conduits is equipped with a flow rate regulation module.

7. A device according to claim 2, characterized in that any of the first, second, or third conduits is equipped with a filtration module.

8. A device according to claim 2, characterized in that the saturation reagent for the remineralization or and/or pH correction contains at least one of the following elements:
    calcium carbonate,
    calcium hydroxide,
    bicarbonates,
    carbonates,
    sulfuric acid, ion exchange resin,
mineral absorbents,
sodium chloride,
calcium chloride.

9. A device according to claim 2, characterized in that the device comprises means for measuring the mineralization and the pH at the outlet of the device, communicating the data to an automated device for controlling a flow rate regulation module.

10. A device according to claim 2, characterized in that the first and the second treatment tanks are detachable and interchangeable.

11. A device according to claim 2, characterized in that the device comprises a flowmeter making it possible to measure the flow rate of the water before or after mixing and a metering pump positioned at the outlet of the treatment tank in order to measure the amount of treated water to be mixed with the non-treated water.

12. A device according to claim 2, characterized in that the device comprises a module for disinfection of the water after the final mixing.

13. Apparatus for remineralization and pH correction of water, the apparatus including:
   an aircraft;
   a fuel cell on board the aircraft, the fuel cell producing water;
   a saturation reagent;
   a first tank;
   a first treatment tank containing the saturation reagent;
   a second tank;
   the tanks arranged top to bottom in the order of the first tank, the first treatment tank, and the second tank;
   means for providing a flow of treated water from the first treatment tank;
   a first conduit leading from the bottom portion of the first tank into a bottom portion of the first treatment tank;
   a second conduit leading from the top portion of the first tank to a top portion of the second tank;
   a third conduit leading from the top portion of the first treatment tank, through which treated water is discharged, rejoining the second conduit whereby mixing occurs at the intersection of second conduit and third conduit; and
   a control valve in conduit upstream of conduit so as to obtain water with the desired mineralization or pH.

14. An apparatus according to claim 13, characterized in that it comprises a first distributor tank in which the demineralized water from the fuel cell arrives, and from which at least two conduits emerge:
   a first conduit leads into a second treatment tank containing a saturation reagent with which the water comes into contact for the purposes of remineralization or pH correction, the water thus treated being discharged to a third conduit,
   a second conduit allows water coming directly from the first treatment tank to circulate, and is rejoined by the treated water coming from the second tank for the purposes of mixing.

15. An apparatus according to claim 13, characterized in that it comprises a first distributor tank in which the demineralized water from the fuel cell arrives and from which three conduits emerge:
   two conduits each lead into a different treatment tank comprising a saturation reagent with which the water comes into contact, the water thus treated being discharged to a fourth conduit and a fifth conduit,
   a third conduit allows water coming directly from the first tank to circulate and is rejoined by the treated water coming from the two treatment tanks inside a mixing tank for the purposes of mixing.

16. An apparatus to claim 13 to be implemented, characterized in that it comprises a division of the conduit for discharge of the demineralized water coming from the fuel cell into two conduits, one of which leads into a first treatment tank, and the treated water conduit leaving said tank joins the non-treated water conduit for the purposes of mixing.

17. An apparatus according to claim 15, characterized in that a first treatment tank comprises a saturation reagent ensuring remineralization and the second treatment tank comprises a saturation reagent ensuring the pH correction.

18. An apparatus according to claim 14, characterized in that a conduit is equipped with a flow rate regulation module.

19. An apparatus according to claim 14, characterized in that a conduit is equipped with a filtration module.

* * * * *